US 12,472,682 B2

(12) United States Patent
Discekici et al.

(10) Patent No.: US 12,472,682 B2
(45) Date of Patent: Nov. 18, 2025

(54) THREE-DIMENSIONAL PRINTING WITH PORE-PROMOTING AGENTS AND ACIDIC AGENTS

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Dennis J. Schissler, San Diego, CA (US); Graciela Emma Negri Jimenez, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 56 days.

(21) Appl. No.: 18/280,871

(22) PCT Filed: Mar. 12, 2021

(86) PCT No.: PCT/US2021/022206
§ 371 (c)(1),
(2) Date: Sep. 7, 2023

(87) PCT Pub. No.: WO2022/191858
PCT Pub. Date: Sep. 15, 2022

(65) Prior Publication Data
US 2024/0157631 A1 May 16, 2024

(51) Int. Cl.
*B29C 64/118* (2017.01)
*B29C 44/34* (2006.01)
(Continued)

(52) U.S. Cl.
CPC .......... *B29C 64/118* (2017.08); *B29C 44/348* (2013.01); *B29C 64/291* (2017.08);
(Continued)

(58) Field of Classification Search
CPC .............................. B29C 64/112; B29C 4/165
See application file for complete search history.

(56) References Cited

U.S. PATENT DOCUMENTS 8,901,202 B2    12/2014   Pastorello et al.
8,956,643 B2    2/2015    Han et al.
(Continued)

FOREIGN PATENT DOCUMENTS

CN    107254151 A    10/2017
CN    109535471 A    3/2019
(Continued)

OTHER PUBLICATIONS

"Potential of hydrogen value", in Chemical Encyclopedia, vol. 1, Eds. Knunyants, I. L., et al., Sovietskaya Encylopedia, Publishing House Moscow house, 1988, p. 406, col. 787.
(Continued)

*Primary Examiner* — Andrew L Swanson
(74) *Attorney, Agent, or Firm* — Dierker & Kavanaugh, P.C.

(57) ABSTRACT

The present disclosure includes a multi-fluid kit for three-dimensional printing. The multi-fluid kit can include a fusing agent comprising water and a radiation absorber that absorbs radiation energy and converts the radiation energy to heat, an acidic agent having a pH from about pH 1 to about pH 6.9 that includes water and an acidic component, and a pore-promoting agent including water and a pore-promoting compound. The pore-promoting compound can chemically react with the acidic component to generate a gas, and can be selected from sodium bicarbonate, potassium bicarbonate, or a combination thereof.

13 Claims, 3 Drawing Sheets

(51) Int. Cl.
*B29C 64/291* (2017.01)
*B29C 64/295* (2017.01)
*B29C 64/112* (2017.01)
*B33Y 10/00* (2015.01)
*B33Y 70/10* (2020.01)

(52) U.S. Cl.
CPC .......... *B29C 64/295* (2017.08); *B29C 64/112* (2017.08); *B33Y 10/00* (2014.12); *B33Y 70/10* (2020.01)

(56) References Cited

U.S. PATENT DOCUMENTS

| | | | | |
|---|---|---|---|---|
| 2013/0331927 | A1* | 12/2013 | Zheng | A61L 31/06 623/1.19 |
| 2018/0055643 | A1* | 3/2018 | Castro | A61L 27/54 |
| 2018/0133957 | A1* | 5/2018 | Ramirez Muela | B29C 64/20 |
| 2018/0370081 | A1* | 12/2018 | McCarthy | B29C 39/36 |
| 2019/0039309 | A1* | 2/2019 | Busbee | B29D 35/126 |
| 2019/0039310 | A1* | 2/2019 | Busbee | A61J 3/06 |
| 2019/0152133 | A1* | 5/2019 | Busbee | B33Y 70/00 |
| 2020/0086597 | A1* | 3/2020 | Jessiman | A43B 13/188 |
| 2021/0001401 | A1 | 1/2021 | Shaarawi et al. | |
| 2021/0331243 | A1* | 10/2021 | Shaarawi | B22F 10/14 |
| 2022/0063187 | A1* | 3/2022 | Chopra | B29C 64/40 |

FOREIGN PATENT DOCUMENTS

| | | |
|---|---|---|
| WO | 2017/062031 A1 | 4/2017 |
| WO | 2019/108288 A1 | 6/2019 |
| WO | 2020/251917 A1 | 12/2020 |

OTHER PUBLICATIONS

Fordtran, J. S., et al., "Gas Production After Reaction of Sodium Bicarbonate and Hydrochloric Acid", Gastroenterology, Nov. 1984, vol. 87, Issue 5, pp. 1014-1021.

Okui, M., et al., "A Pneumatic Power Source Using a Sodium Bicarbonate and Citric Acid Reaction with Pressure Booster for Use in Mobile Devices", IEEE/RSJ International Conference on Intelligent Robots and Systems (IROS) Sep. 24-28, 2017, pp. 1040-1045.

Pillai, M. M., et al., "A novel method for developing three dimensional (3D) silk PVA microenvironments for bone tissue engineering—an in vitro study", Biomedical Physics & Engineering Express, vol. 4, Issue 2, Jan. 30, 2018, 3 pages (Abstract only).

* cited by examiner

┌─────────────────────────────────────────────────────────┐
│ iteratively applying individual build material layers of polymer particles │ — 410
│ to a powder bed │
└─────────────────────────────────────────────────────────┘
                              │
┌─────────────────────────────────────────────────────────┐
│ based on a three-dimensional object model, selectively applying a │
│ fusing agent onto the individual build material layers, wherein the │ — 420
│ fusing agent comprises water and a radiation absorber │
└─────────────────────────────────────────────────────────┘
                              │
┌─────────────────────────────────────────────────────────┐
│ based on the three-dimensional object model, selectively applying a │
│ pore-promoting agent onto the individual build material layers, │
│ wherein the pore-promoting agent comprises water and a pore- │
│ promoting compound that is water-soluble, wherein the pore- │ — 430
│ promoting compound is selected from the group consisting of sodium │
│ bicarbonate, potassium bicarbonate, or a combination thereof │
└─────────────────────────────────────────────────────────┘
                              │
┌─────────────────────────────────────────────────────────┐
│ based on the three-dimensional object model, selectively applying an │
│ acidic agent onto the individual build material layers at a location of │
│ application of the pore-promoting agent, wherein at the location the │
│ pore-promoting compound chemically reacts with the acidic │ — 440
│ component generating gas bubbles within the individual build material │
│ layers │
└─────────────────────────────────────────────────────────┘
                              │
┌─────────────────────────────────────────────────────────┐
│ exposing the build material to energy which generates heat to │
│ selectively fuse the polymer particles in contact with the radiation │
│ absorber forming a fused polymer matrix at individual build material │ — 450
│ layers with the gas bubbles distributed within the fused polymer matrix │
└─────────────────────────────────────────────────────────┘

FIG. 4 ents and Acidic
THREE-DIMENSIONAL PRINTING WITH PORE-PROMOTING AGENTS AND ACIDIC AGENTS

BACKGROUND

Methods of three-dimensional (3D) digital printing, a type of additive manufacturing, have continued to be developed over the last few decades. However, systems for three-dimensional printing have historically been expensive, though those expenses have been coming down to more affordable levels recently. In general, three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to print three-dimensional functional parts with desired properties such as mechanical strength, visual appearance, and so on. Nevertheless, several commercial sectors such as aviation and the medical industry have benefitted from the ability to rapidly prototype and customize parts for customers.

The figures depict examples of the presently disclosed technology. However, it should be understood that the present technology is not limited to the examples depicted.

DETAILED DESCRIPTION

A way to modulate mechanical properties of a three-dimensional printed part or additive manufactured part without changing the polymer build material can include the use of various fluid agents and/or manufacturing methods. The multi-fluid kits and other materials kits, as well as the methods and systems of three-dimensional printing disclosed herein, provide for the generating of parts by three-dimensional printing with added porosity, or in some examples, porous cores with solid outer shells without significant trapped powder within the pores. This can be accomplished by generating in situ gases during the build process, which can also provide for specified location and spatial control over pore density.

In accordance with this, in one example, a multi-fluid kit for three-dimensional printing can include a fusing agent, an acidic agent, and a pore-promoting agent. The fusing agent can include water and a radiation absorber, wherein the radiation absorber absorbs radiation energy and converts the radiation energy to heat. The acidic agent can include water and an acidic component, and can have a pH from about 1 to about 6.9. The pore-promoting agent can include water and a pore-promoting compound. The pore-promoting compound can chemically react with the acidic component from the acidic agent to generate a gas. The pore-promoting compound can be, for example, selected from sodium bicarbonate, potassium bicarbonate, or a combination thereof. The pore-promoting compound can be, for example, sodium bicarbonate and can be present in an amount from about 1 wt % to about 10 wt % with respect to the total weight of the pore-promoting agent. The pore-promoting compound can alternatively be potassium bicarbonate and can be present in an amount from about 1 wt % to about 20 wt % with respect to the total weight of the pore-promoting agent. The acidic agent and the pore-promoting agent can both independently include organic co-solvent and surfactant (which can be the same or different relative to one another). The acidic component can be, for example, an organic acid selected from lactic acid, acetic acid, formic acid, citric acid, oxalic acid, uric acid malic acid, tartaric acid, or a combination thereof. In another example, the acidic component can be an inorganic acid selected from hydrochloric acid, hydrobromic acid, hydroiodic acid, perchloric acid, phosphoric acid, sulfuric acid, boric acid, nitric acid, nitrous acid, or a combination thereof. The pore-promoting compound can generate a gas at an elevated temperature of from about 80° C. to about 200° C. in some examples, and thus, the pore-promoting compound can generate an increased volume density of gas at the elevated temperature with contacted by the acidic component (relative to volume density where the pore-promoting compound is present at the same concentration without application of the acidic component). In further detail, by way of example, the radiation absorber can include a metal dithiolene complex, carbon black, a near-infrared absorbing dye, a near-infrared absorbing pigment, metal nanoparticles, a conjugated polymer, or a combination thereof.

In another example, a three-dimensional printing kit can include a build material including polymer particles, and a fusing agent including water and a radiation absorber that absorbs radiation energy and converts the radiation energy to heat. The three-dimensional printing kit can also include an acidic agent having a pH from about 1 to about 6.9 and which includes water and an acidic component, and a pore-promoting agent comprising water and a pore-promoting compound. The pore-promoting compound can chemically react with the acidic component to generate a gas. The pore-promoting compound can be selected from sodium bicarbonate, potassium bicarbonate, or a combination thereof. In one example, the polymer particles can have a D50 particle size from about 20 μm to about 150 μm and can include polyamide-6, polyamide-9, polyamide-11, polyamide-12, polyamide-6,6, polyamide-6,12, polyethylene, thermoplastic polyurethane, thermoplastic polyamide, polypropylene, polyester, polycarbonate, polyether ketone, polyacrylate, polystyrene powder, wax, or a combination thereof. The pore-promoting compound, for example, can generate a gas at an elevated temperature of from about 80° C. to about 200° C., but can also generate a gas at lower temperatures or even at an increased volume density of gas at the elevated temperature when contacted by the acidic component. For example, sodium bicarbonate can generate a gas at about 80° C.

In another example, a method of three-dimensional printing can include iteratively applying individual build material layers of polymer particles to a powder bed, and based on a three-dimensional object model, selectively applying a fusing agent onto the individual build material layers, wherein the fusing agent comprises water and a radiation absorber.

The method can further include selectively applying a pore-promoting agent onto the individual build material layers based on the three-dimensional object model. The pore-promoting agent can include water and a pore-promoting compound selected from sodium bicarbonate, potassium bicarbonate, or a combination thereof. Furthermore, based on the three-dimensional object model, the method can include selectively applying an acidic agent onto the individual build material layers at a location of application of the pore-promoting agent. At this location, the pore-promoting compound chemically reacts with the acidic component generating gas bubbles within the individual build material layers. The method can further include exposing the build material to energy which generates heat to selectively fuse the polymer particles in contact with the radiation absorber forming a fused polymer matrix at individual build material layers with the gas bubbles distributed within the fused polymer matrix. In one example, in addition to the reaction between the pore-promoting compound and the acidic compound that generates gas bubbles, the heat that selectively fuses the polymer particles can further contribute to generating the gas bubbles. Isolated pores in the fused polymer matrix resulting from both reaction with the acidic compound and application of heat have a D50 diameter from about 1 μm to about 500 μm, for example. The method can result in the formation of a three-dimensional printed object with a first portion of the fused polymer matrix having a first porosity volume at a first location where the fusing agent, the pore-promoting agent, and the acidic agent were applied and then heat fused. The three-dimensional printed object can also include a second portion of the fused polymer matrix having a second porosity volume that is lower than the first porosity volume where the fusing agent was applied without application of the acidic agent. In further detail, at the second portion, the pore-promoting agent may have also not been applied. In this example, the three-dimensional printed object may further include a third portion where the fusing agent and the pore-promoting agent were applied without application of the acidic agent with the third portion having a third porosity volume that is lower than the first porosity volume but higher than the second porosity volume.

The multi-fluid kits, materials kits, and methods described herein can be used to make three-dimensional (3D) printed objects that are porous or that have porous portions, or may include multiple porous portions with a different volume density of pores. In particular, methods that involve three-dimensional printing using a build material of polymer particles, a pore-promoting agent and an acidic agent can be selectively applied to the build material. A fusing agent can also be selectively applied to the build material to promote three-dimensional polymer particle fusion during the build process. The fusing agent can include a radiation absorber that can absorb radiation and convert the radiation to heat. At the layer-level, for example, in addition to applying the fusing agent, the pore-promoting agent, and the acidic agent, the build material can be exposed to radiation. The acidic component of the acidic agent and the pore-promoting compound of the pore-promoting agent can react chemically to generate gas bubbles. Furthermore, portions of the build material where the fusing agent was applied can heat up to the point that the polymer particles can become fused together to form a solid layer. At the same time, the heat can cause the pore-promoting compound in the pore-promoting agent to react and form a gas, in addition to the gas generated or being generated by the chemical reaction between the pore-promoting compound and the acidic compound.

In some examples, the gas can become trapped as small bubbles in the molten polymer. When the polymer hardens, the bubbles can remain as pores within the polymer matrix. In some cases, the pore-promoting agent and/or the acidic agent can be applied in the same areas as the fusing agent to make a three-dimensional printed object that has uniform porosity throughout the object. In other examples, the pore-promoting agent and/or the acidic agent can be printed on a limited portion of the area where the fusing agent was printed. This can form a three-dimensional printed object that has a porous portion and a non-porous portion. In still other examples, the pore-promoting agent can be applied to the more limited portion and the acidic agent can be applied to a still more limited sub-portion thereof. This can generate a three-dimensional printed object having two (or more) levels of porosity within the porous portion as well as a nonporous portion. Any size, shape, and number of porous portions can be designed and produced in the three-dimensional printed object by selectively applying the pore-promoting agent.

Forming three-dimensional printed objects with porosity as described herein can be a challenge due to the particulate material being used as the main material for forming the three-dimensional object. In methods that use a build material of polymer particles to form a three-dimensional printed object with internal closed pores without a way to push the powder or molten powder out, fused polymer with trapped powder within the pores can result. Additionally, methods of three-dimensional printing using build material of polymer particles are usually limited as to the size of features that can be formed by the printing resolution of the process. By generating a gas within molten polymer during the build, pores can be generated that are essentially devoid of the build material.

Porosity formed using the methods described herein can affect the overall properties of the three-dimensional printed object. For example, a three-dimensional printed object can be made porous in order to reduce the weight of the object. In another example, porosity can be introduced with the intention of reducing the stiffness or strength of the object. In another example, porosity can be used to manipulate crack propagation. In other words, porosity can also help determine how a crack might route/propagate through a part. A certain portion of the three-dimensional printed object may be made porous to make that particular portion less stiff if desired. Thus, the ability to selectively form porous portions, and even form porous portions of different densities, in the three-dimensional printed objects can be useful in a variety of applications.

The systems, materials, and methods described herein can allow for the extent of porosity to be controlled and tuned at temperatures that are lower than those for some compounds like urea. Lower temperatures allow for reduced oxidation of the polymer particles of the build material thereby reducing any unnecessary oxidation/yellowing issues at temperatures higher than 200° C. The pores can be formed by a pore-promoting compound in the pore-promoting agent and/or by a combination of the pore-promoting compound and the acidic compound as applied to react at the individual layer-level of the three-dimensional object. The pore-promoting compound can be a compound that chemically reacts to form a gas when the compound is heated to an elevated temperature of from about 80° C. to about 200° C. and/or which reacts with the acidic component. In one example, the pore-promoting compound can be sodium bicarbonate, potassium bicarbonate, or a combination thereof. In further detail, the acidic component of the acidic agent can be any component that provides a pH to the acidic agent from about pH 1 to about pH 6.9. Examples may include, for example, an organic acid or an inorganic acid. Example organic acids can be lactic acid, acetic acid, formic acid, citric acid, oxalic acid, uric acid malic acid, tartaric acid, or a combination thereof. Example inorganic acids can be hydrochloric acid, hydrobromic acid, hydroiodic acid, perchloric acid, phosphoric acid, sulfuric acid, boric acid, nitric acid, nitrous acid, or a combination thereof.

In some examples, the level of porosity in the three-dimensional printed object can be adjusted by changing the amount of pore-promoting compound and/or the level of acidic compound that is applied from their respective fluid agents to the build material. In other examples, the level of porosity can be adjusted by changing the amount of heating provided to the pore-promoting compound. For example, the build material with the pore-promoting compound applied thereto can be exposed to more intense radiation or exposed for a longer time to supply more heat to the pore-promoting compound, and thereby cause more of the pore-promoting compound to react to form gas. Accordingly, the methods described herein provide multiple avenues for controlling the porosity level in the three-dimensional printed object.

Multi-Fluid Kits

Figure 1:
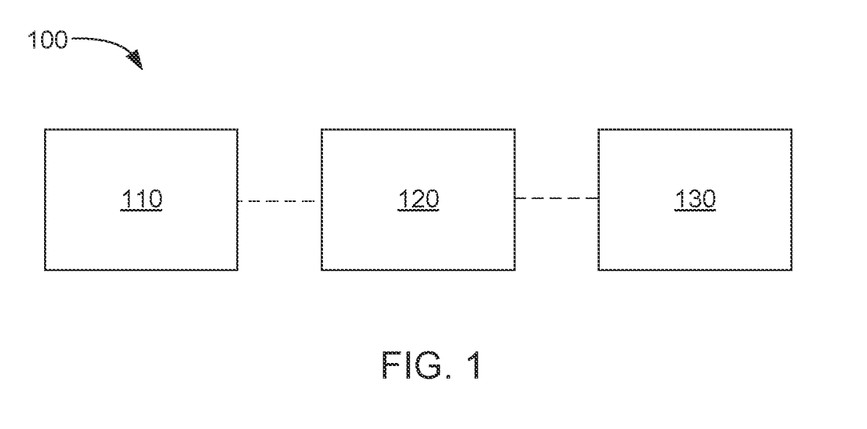
FIG. 1 is a schematic view of an example multi-fluid kit for three-dimensional printing in accordance with examples of the present disclosure.

With this description in mind, FIG. 1 shows a schematic view of an example multi-fluid kit for three-dimensional printing 100. The multi-fluid kit includes a fusing agent 110, a pore-promoting agent 120, and an acidic agent 130. The fusing agent can include water and a radiation absorber. The radiation absorber can absorb radiation energy and convert the radiation energy to heat. The pore-promoting agent can include water and a water-soluble pore-promoting compound selected from sodium bicarbonate, potassium bicarbonate, or a combination thereof. The acidic agent can include an acidic component, such as an organic acid, an inorganic acid, or another compound that provides acidity to the acidic agent, e.g., from about pH 1 to about pH 6.9, from about pH 2 to about pH 6, or from about pH 3 to about pH 5.

In some examples, there may be other fluid agents present in the multi-fluid kits. For example, the multi-fluid kit may also include a coloring agent and/or a detailing agent. The coloring agent, if present, may include a colorant and a liquid vehicle that may be fluid jettable from jetting architecture. A detailing agent, if present, can include a detailing compound that can reduce the temperature of build material onto which the detailing agent is applied. In some examples, the detailing agent can be applied around edges of the area where the fusing agent is applied. This can prevent build material around the edges from caking due to heat from the area where the fusing agent was applied. The detailing agent can also be applied in the same area where fusing was applied in order to control the temperature and prevent excessively high temperatures when the build material is fused.

Three-Dimensional Printing Kits

Figure 2:
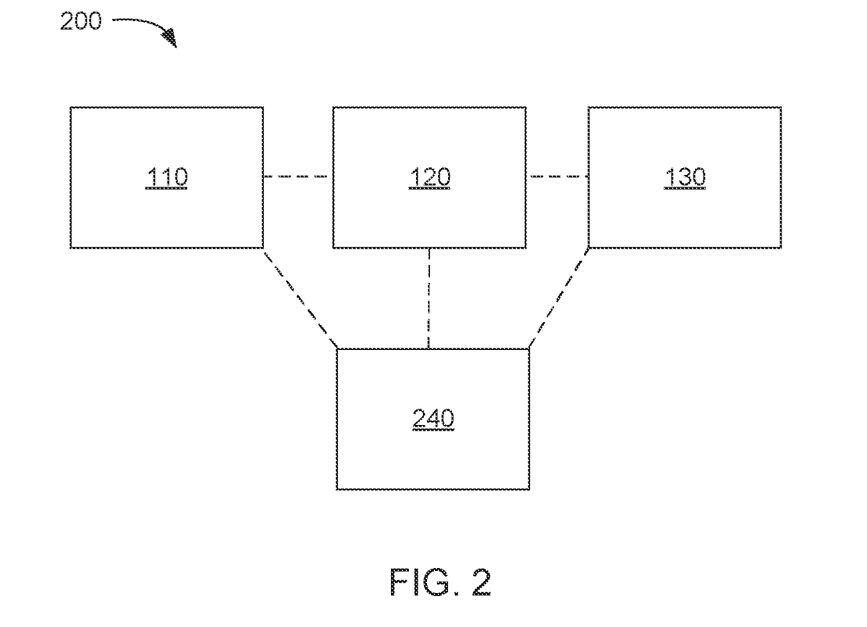
FIG. 2 is a schematic view of an example three-dimensional printing kit of materials in accordance with examples of the present disclosure.

The present disclosure also describes materials kits for three-dimensional printing. In some examples, the materials kits can include materials that can be used in the three-dimensional printing processes described herein. FIG. 2, more specifically, provides a schematic illustration of a three-dimensional printing kit 200 in accordance with examples of the present disclosure. The kit includes a build material 240 including polymer particles, a fusing agent 110 to selectively apply to the build material, a pore-promoting agent 120 to selectively apply to the build material, and an acidic agent to selectively apply to the build material, and in particular to the build material at some or all locations where the pore-promoting agent has been or will be applied. The pore-promoting agent includes a pore-promoting compound, which can be a compound that chemically reacts to form a gas when the compound is heated to an elevated temperature of from about 80° C. to about 200° C. The pore-promoting compound can be selected from sodium bicarbonate, potassium bicarbonate, or a combination thereof. The acidic agent can include an acidic component, such as an organic acid, an inorganic acid, or another compound that provides acidity to the acidic agent, e.g., from about pH 1 to about pH 6.9, from about pH 2 to about pH 6, or from about pH 3 to about pH 5. As described above, the fusing agent can be applied to build material in areas of a powder bed that are to be fused to form a layer of a three-dimensional printed object.

Three-Dimensional Printing Methods

Figure 3A:
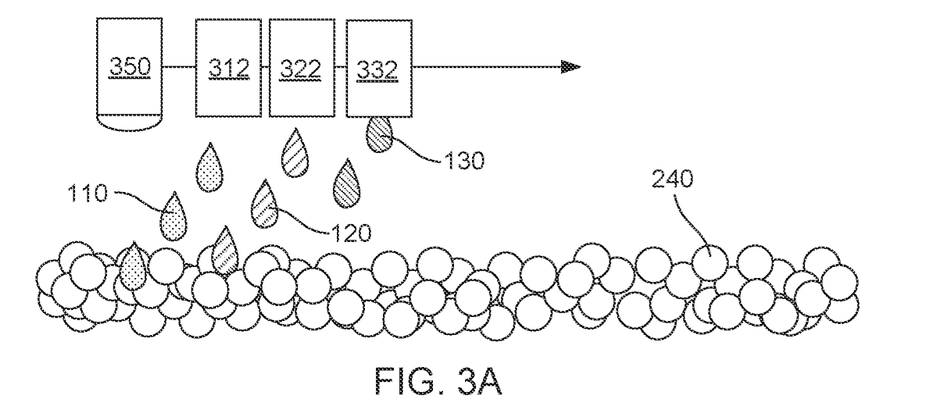
FIGS. 3A-3C show a schematic view of an example three-dimensional printing process using an example multi-fluid kit in accordance with examples of the present disclosure.
Figure 3B:
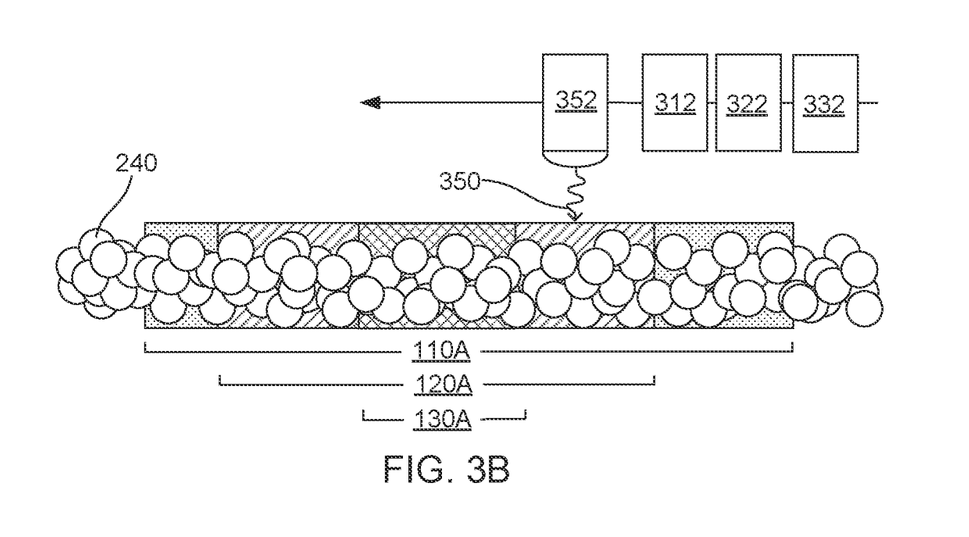
Figure 3C:
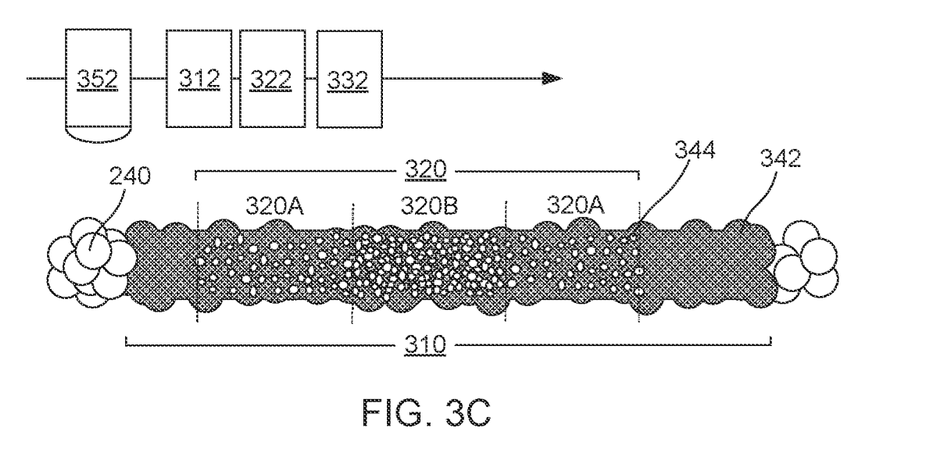

FIGS. 3A-3C illustrate an example of using the multi-fluid kits to form a three-dimensional printed object. In FIG. 3A, a fusing agent 110, a pore-promoting agent 120, and an acidic agent 130 are selectively jetted onto a layer of build material 340 of a powder bed. The build material includes polymer particles that can be heat fused, forming a molten polymer during formation, for example, as described herein. The fusing agent can be jetted from a fusing agent ejector 312, the pore-promoting agent can be jetted from a pore-promoting agent ejector 322, and the acidic agent can be ejected from an acidic agent ejector 332. These fluid ejectors can move across the layer of polymer particles to selectively jet fusing agent on areas that are to be fused, while the pore-promoting agent can be jetted onto areas for enhanced porosity. Still further, the acidic agent can be jetted on areas where the pore-promoting agent has been or will be applied, either with the same footprint or with a different (typically smaller) footprint to provide for enhanced porosity, often more so than areas where only the pore-promoting agent has been applied. If another fluid agent is used, such as a coloring agent and/or a detailing agent, there may be additional ejector(s) present (not shown) that contain the additional fluid agent(s) to be applied. A coloring agent, for example, can be applied to add color to the printed object. A detailing agent can be applied at or about boundary areas of the three-dimensional printed object being printed for cooling, or within the three-dimensional printed object area for added cooling in some instances. Also shown in FIGS. 3A-3C is a radiation source 352 that can also move across the layer of polymer particles.

FIG. 3B shows the layer of build material 340, which includes polymer particles, after the fusing agent 110 has been jetted onto an area of the layer that is to be fused at region 110A. Additionally, the pore-promoting agent 120 has been jetted onto a portion of the area where the fusing agent is also applied, as shown at region 120A. The acidic agent 130 in this example has been applied at region 130A, where both the fusing agent and the pore-promoting agent have also been applied. In this figure, the radiation source 352 is shown emitting radiation 350 toward the layer of polymer particles. The fusing agent, which includes a radiation absorber, can thus absorb this radiation and convert the radiation energy to heat, causing the polymer particles of the build material to form a molten polymer. As a molten polymer, gas bubbles generated by the heat applied to the pore-promoting compound and/or by the reaction of the pore-promoting compound and the acidic component of the respective fluid agents can become embedded therein, and as it cools, can leave pores within the three-dimensional printed object.

FIG. 3C shows the layer of build material including polymer particles 240 with a fused portion 310 where the fusing agent was applied and irradiated to generate heat sufficient to form a molten polymer. This layer has reached a sufficient temperature to fuse the polymer particles together to form a solid polymer matrix 342 upon cooling or solidifying. At areas where the pore-promoting agent was applied and in some locations where the acidic agent was applied, gas bubbles are formed that when cooled, leave a plurality of pores 344. In this example, a porous region 320 forms that includes multiple sub-regions having different densities of gas-generated bubbles and resultant pores. A first region 320A (shown at two locations) includes a relative lower density of pores and a relative higher density of material. A second region 320B includes a relative higher density of pores and a relative lower density of material. In this instance, pores are generated along the entire porous region shown, but a higher density of pores are generated where the acidic agent was also applied in addition to heat. Thus, in the first region, heat is used to generate gas bubbles in the molten polymer to generate pores. However, in the second region, a relatively higher density of gas bubbles are generated within the molten polymer due to both chemical reaction between the pore-promoting agent and the acidic agent in addition to the application of heat generated by the radiation absorber in response to interaction with the radiation energy. Thus, there are two densities or concentrations of gas bubbles generated in this example, but of which are formed or are forming within the molten polymer, and the gas bubbles become trapped when the polymer re-solidifies or cools to form the solid polymer matrix.

Figure 4:
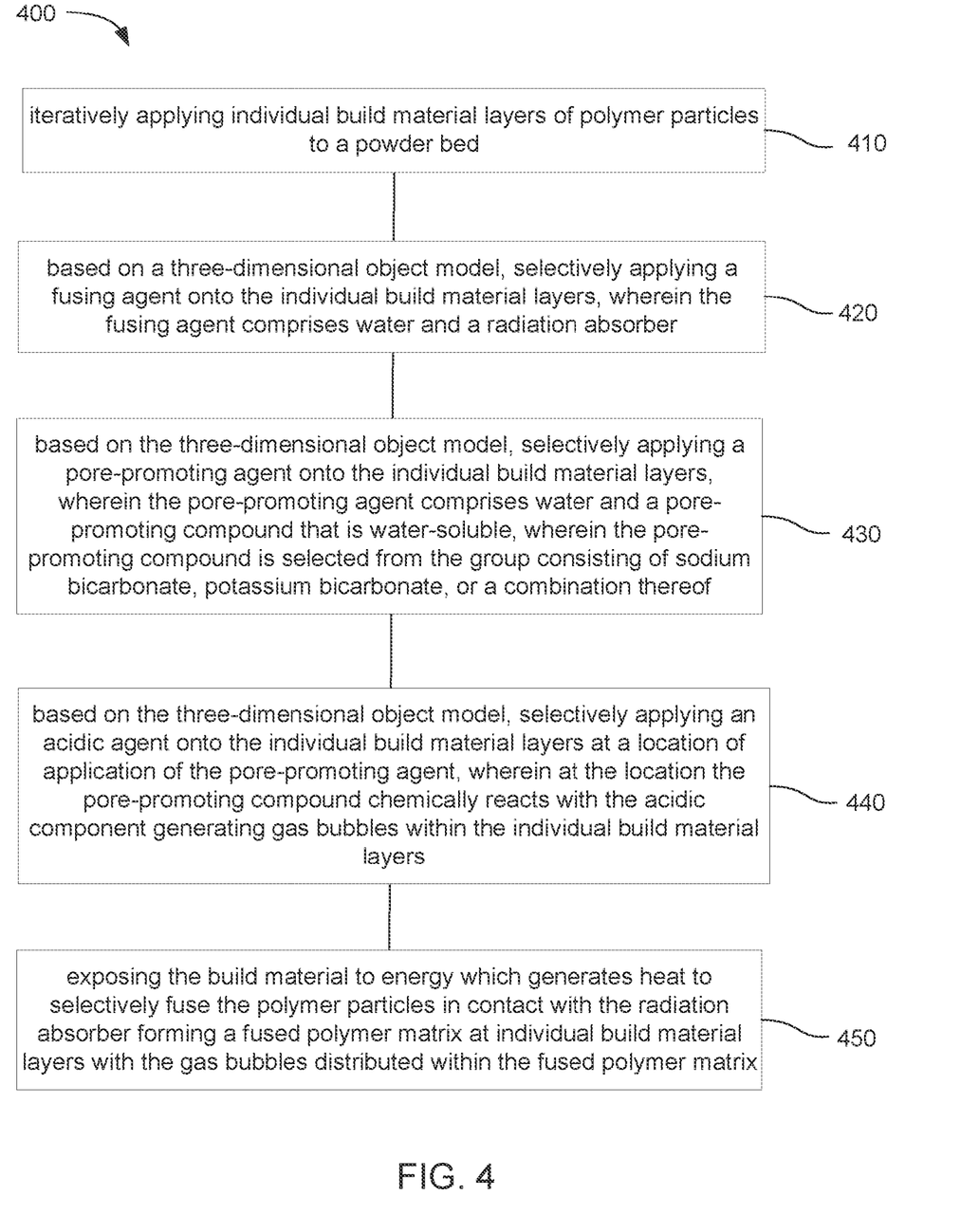
FIG. 4 is a flowchart illustrating an example method of making a three-dimensional printed object in accordance with examples of the present disclosure.

In further detail, and as shown by example in FIG. 4, an example method 400 of three-dimensional printing can include iteratively applying 410 individual build material layers of polymer particles to a powder bed, and based on a three-dimensional object model, selectively applying 420 a fusing agent onto the individual build material layers, wherein the fusing agent comprises water and a radiation absorber. The method can further include selectively applying 430 a pore-promoting agent onto the individual build material layers based on the three-dimensional object model. The pore-promoting agent can include water and a pore-promoting compound selected from sodium bicarbonate, potassium bicarbonate, or a combination thereof. Furthermore, based on the three-dimensional object model, the method can include selectively applying 440 an acidic agent onto the individual build material layers at a location of application of the pore-promoting agent. At this location, the pore-promoting compound chemically reacts with the acidic component generating gas bubbles within the individual build material layers. The method can also include exposing 450 the build material to energy which generates heat to selectively fuse the polymer particles in contact with the radiation absorber forming a fused polymer matrix at individual build material layers with the gas bubbles distributed within the fused polymer matrix.

In one example, in addition to the reaction between the pore-promoting compound and the acidic compound that generates gas bubbles, the heat that selectively fuses the polymer particles can further contribute to generating the gas bubbles. Isolated pores in the fused polymer matrix resulting from both reaction with the acidic compound and application of heat have a D50 particle size from about 1 µm to about 500 µm, for example. The method can result in the formation of a three-dimensional printed object with a first portion of the fused polymer matrix having a first porosity volume at a first location where the fusing agent, the pore-promoting agent, and the acidic agent were applied and then heat fused. The three-dimensional printed object can also include a second portion of the fused polymer matrix having a second porosity volume that is lower than the first porosity volume where the fusing agent was applied without application of the acidic agent. In further detail, at the second portion, the pore-promoting agent may have also not been applied. In this example, the three-dimensional printed object may further include a third portion where the fusing agent and the pore-promoting agent were applied without application of the acidic agent with the third portion having a third porosity volume that is lower than the first porosity volume but higher than the second porosity volume.

In some examples, a detailing agent can also be jetted onto the build material. As described above, the detailing agent can be a fluid that reduces the maximum temperature of the polymer particles on which the detailing agent is printed. In particular, the maximum temperature reached by the powder during exposure to electromagnetic energy can be less in the areas where the detailing agent is applied. In certain examples, the detailing agent can include a solvent that evaporates from the polymer particles to evaporatively cool the polymer particles. The detailing agent can be printed in areas of the powder bed where fusing of the build material is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas As mentioned above, in some examples, an elevated temperature at which the pore-promoting compound can chemically react (in the absence of the acidic agent) can be from about 80° C. to about 200° C. As mentioned, reaction can occur at even lower temperatures when the acidic agent is present. In some examples, the pore-promoting compound and the build material onto which the pore-promoting compound is jetted can reach this elevated temperature when the radiation energy is applied to the build material. However, in some examples, the powder bed can be raised to a temperature below the melting or softening temperature of the polymer particles of the build material, and then raised above the softening or melting temperature upon application of heat. To illustrate, the entire build material can be preheated to a temperature below the melting or softening point of the polymer particles. Thus, a preheat temperature can be within 50° C. of the melting or softening point, e.g., from about 10° C. to about 30° C. below the melting or softening point. In a particular example, the preheat temperature can be from about 100° C. to about 120° C. and the polymer particles can be thermoplastic polyamide polymer particles. In another example, the preheat temperature can be about 90° C. to about 100° C. and the polymer particles can be thermoplastic polyurethane. Preheating can be accomplished with a lamp or lamps, an oven, a heated support bed, or other types of heaters. In some examples, the entire build material can be heated to a substantially uniform temperature. Regardless of which approach is followed, the elevated temperature can be above or below the melting or softening point of the polymer particles. In any of these examples, the pore-promoting compound can react with the acidic component, and in some instances, can be heated to a sufficient temperature to react and form a gas while the polymer particles are in a melted or softened state so that gas bubbles can form in the molten polymer, which may be a melted or softened polymer.

Also as mentioned above, a variety of variables of the "print mode" can be adjusted to affect the level of porosity in the three-dimensional printed object. In some examples, the methods of making three-dimensional printed objects can include adjusting these variables to modify the level of porosity. In certain examples, the variables can include the amount of fusing agent applied to the build material, the amount of pore-promoting agent applied to the build material, the thickness of individual layers of build material, the intensity and duration of radiation applied to the build material, the preheating temperature of the build material, and so on.

The various fluid agents can be jetted onto the build material using fluid jet print heads. The amount of pore-promoting agent and/or acidic agent jetted onto the powder can be calibrated based on the concentration of pore-promoting compound in the pore-promoting agent, and the desired porosity of the resulting porous portion to be printed, among other factors. Similarly, the amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer particles. For example, if an individual layer of the build material is 100 μm thick, then the fusing agent can penetrate 100 μm into the build material, or may penetrate less than 100 μm in some instances. Thus, in some examples, the fusing agent can heat the polymer particles throughout the entire layer, even in some instances without 100% penetration. With sufficient penetration and heat generated, the layer can coalesce and bond to the layer below. After forming a solid layer, a new layer of loose powder can be formed, either by lowering the build material or by raising the height of a powder roller and rolling a new layer of powder.

The build material can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the build material. Such a fusing lamp can make multiple passes over the bed depending on the amount of exposure used to coalesce the individual printed layer. The fusing lamp can be configured to irradiate the entire build material with a substantially uniform amount of energy. This can selectively coalesce the printed portions with fusing agent leaving the unprinted portions of the polymer particles below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer particles, the absorbance of the radiation absorber, the preheat temperature, and the melting or softening point of the polymer, an appropriate amount of irradiation can be supplied from the fusing lamp. In some examples, the fusing lamp can irradiate individual layers for from about 0.5 to about 10 seconds per pass.

The three-dimensional printed object can be formed by jetting a fusing agent onto layers of build material according to a three-dimensional object model. The three-dimensional object models can in some examples be created using computer aided design (CAD) software. The three-dimensional object models can be stored in any suitable file format. In some examples, a three-dimensional printed object as described herein can be based on a single three-dimensional object model. The three-dimensional object model can define the three-dimensional shape of the object and the three-dimensional shape of porous portions to be formed in the three-dimensional printed object. In other examples, the object can be defined by a first three-dimensional object model and the porous portions can be defined by a second three-dimensional object model. Other information may also be included, such as structures to be formed of additional different materials or color data for printing the object with various colors at different locations on the object. The three-dimensional object model may also include features or materials specifically related to jetting fluids on layers of build material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, concentration of the pore-promoting compound, concentration of the acidic compound, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer particles can be spread on a bed to form a build material. At the beginning of the process, the build material can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a powder bed" includes spreading polymer particles onto the empty build platform for the first layer. In other examples, a number of initial layers of polymer particles can be spread before the printing begins. These "blank" layers of build material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet printhead, can then be used to print a fusing agent including a radiation absorber over portions of the build material corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer particles can be spread over the build material and the process can be repeated to form additional layers until a complete three-dimensional object is printed. Thus, "applying individual build material layers of polymer particles to a powder bed" also includes spreading layers of polymer particles over the loose objects and fused layers beneath the new layer of polymer particles.

In certain examples, the three-dimensional printed object can be formed with porosity throughout the three-dimensional printed object, or with a porous portion of any desired shape located in any desired location within the three-dimensional printed object. In one example, the three-dimensional printed object can have a porous interior and a solid exterior surface. For example, the three-dimensional printed object can be designed to have a solid layer or shell without any pore-promoting agent or acidic agent applied, and then an interior portion can include locations where the pore-promoting agent or both the pore-promoting agent and the acidic agent is applied. In some examples, the solid shell can be from about 20 μm to about 2,000 μm thick, or any other desired thickness. In further examples, porosity can be formed in the three-dimensional printed object for the purpose of reducing the weight of the object, increasing buoyancy of the object, decreasing strength of the object, increasing flexibility of the object, and so on. In one example, a certain portion of the object can be made highly porous to form a breakaway segment that can be snapped apart with moderate force. In another example, a portion of the object can be made porous while other portions are non-porous, to provide for a more flexible porous segment connected to more rigid non-porous segments. In yet another example, a hidden label, code, or identification mark can be formed using the pore-promoting agent or pore-promoting agent and acidic agent. For example, a porous portion of a particular shape can be formed in the interior of the three-dimensional printed object beneath the surface, so that the porous portion is not visible to the human eye. The porous portion can be detected using detection equipment to find or read the hidden identification label or code. In this way, a porous label or code can be used to verify authenticity of a three-dimensional printed object or to store information about the three-dimensional printed object. Besides these examples, three-dimensional printed objects with porous portions can be used for a variety of additional applications.

The pore-promoting agent and/or the acidic agent can be applied to areas of the build material where porosity is to be formed. When applying the pore-promoting agent and the acidic agent to the build material, the concentration of pore-promoting compound and acidic compound, respectively, or other factors such as selection of acid used, can determine how much of the individual fluid agents to apply. In some examples, however, there may be three-dimensional printing kits, systems, and methods that utilize from about 1 part of pore-promoting agent (by volume) for every about ½₀ to 3 parts (by volume) of acidic agent. Parts by volume ratios can be determined by how many drops are applied, provided the formulations and printing architectures used provide a similar drop volume when printing, for example.

In further detail, in some examples the respective fluid agents can be applied at a volume so that there is about an equal molar ratio of pore-promoting compound compared to the acidic compound that is contacted in the powder bed where the layer(s) of build material reside for printing. In other examples, the molar ratio of pore-promoting compound to acidic compound can be from about 5:1 to about 1:1 so that there is not an excess of acidic compound, but there may be an excess of pore-promoting compound that can generate gas bubbles with heat, even if all of the acidic compound is otherwise reacted with other pore-promoting compound molecules. In other examples, the molar ratio of pore-promoting compound to acidic compound to be applied to the build material can be from about 1:2 to about 5:1, from about 1:1 to about 4:1, from about 1:1 to about 3:1, from about 1:1 to about 2:, or from about 2:1 to about 5:1, for example.

As used herein, "pores" refers to void spaces in the solid polymer matrix. The void spaces may be individual, closed void spaces that are separated from other void spaces by a solid polymer. In other examples, the void spaces may be interconnected with other void spaces. In some instances, there may be more interconnected void spaces or even larger voids where the pore-promoting component is reacted with the acidic component. Thus, in various examples, depending on the extent of porosity, the pores can range from a fully interconnected network of voids to a collection of discrete, unconnected voids. In further examples, the void spaces can be filled by gas that is generated by a chemical reaction of the pore-promoting compound.

As used herein, "porosity" in a general context can refer to the presence of pores in the fused polymer matrix. In the context of a specific value, "porosity" can be defined as the volume fraction of void space in the fused polymer with respect to the entire volume of the fused polymer together with the void space. The void space can refer to voids formed by the chemical reaction of the pore-promoting compound, and not void spaces designed into the three-dimensional model for three-dimensional printing the object in question. Any geometry designed into the three-dimensional object model can be considered features of the "entire volume of the fused polymer" and the fraction of void space can be based on the voids formed by gas generated by the pore-promoting compound. Additionally, porosity can be measured with respect to the entire three-dimensional printed object or with respect to a porous portion of the three-dimensional printed object (where the pore-promoting agent was applied).

In some examples, a porous portion of a three-dimensional printed object made using the methods described herein can have a porosity (within discrete regions or throughout) from about 0.1 vol % to about 50 vol %. In further examples, the porous portion can have a porosity from about 1 vol % to about 30 vol % or from about 5 vol % to about 20 vol %. Additionally, the size of the pores can vary. In three-dimensional printed objects where there are multiple porosities, such as that shown in FIG. 3C where there is an essentially non-porous region (at the edges of 310), a first region 320A with moderate porosity, and second region 320B with enhanced porosity, the first region may have a porosity from about 0.1 vol % to about 25 vol %, from about 0.1 vol % to about 15 vol %, or from about from about 0.1 vol % to about 10 vol %, and the second region may have a porosity from about 1 vol % to about 50 vol %, from about 10 vol % to about 50 vol %, from about from about 20 vol % to about 10 vol %, or from about 30 vol % to about 50 vol %, with the proviso that the porosity of the second region is greater than the porosity of the first region. Regardless of their location or region, in further detail, the pores can have a D50 particle size from about 1 µm to about 500 µm, from about 1 µm to about 300 µm, from about 1 µm to about 200 µm, or from about 5 µm to about 100 µm.

Build Materials

In further detail regarding the build material, the polymeric particles can be present in the build material at from about 80 wt % to 100 wt %, from about 90 wt % to 100 wt %, from about 95 wt % to 100 wt %, from about 80 wt % to about 90 wt %, from about 85 wt % to about 95 wt %, or at about 100 wt %. Other particles other than the polymeric particles, if present, can be included such as filler, charging particles, flow aid particles, etc., as described in detail hereinafter.

The polymeric particles can be selected from polyacetal, polyacrylate, polyamide, polybutylene terephthalate, polycarbonate, polyester, polyether ketone, polyethylene terephthalate, polyethylene, polypropylene, polystyrene, polyurethane, thermoplastic polyamides, thermoplastic polyurethane, copolymers thereof, blends of any of the multiple polymers listed herein, as well as mixtures thereof. In one example, the polymeric particles can include a polyamide, and the polyamide can be selected from polyamide-6, polyamide-9, polyamide-11, polyamide-12, polyamide-66, polyamide-612, or a combination thereof. In yet other examples, the polymeric particles can include a polyacrylate, polybutylene terephthalate, polycarbonate, polyester, polyethylene, polystyrene, polyurethane, copolymers thereof, blends of any of the multiple polymers listed herein, as well as mixtures thereof. Core shell polymer particles of these materials may also be used. In some examples, the build material can exclude amorphous materials.

The polymeric particles (and other particles if present) of the build material can have a D50 particle size that can range from about 10 µm to about 150 µm. Polymeric particles can have a D50 particle size that can range from about 10 µm to about 150 µm, from about 10 µm to about 100 µm, from about 20 µm to about 80 µm, from about 30 µm to about 50 µm, from about 25 µm to about 75 µm, from about 40 µm to about 80 µm, from about 50 µm to about 75 µm, from about 75 µm to about 150 µm, from about 60 µm to about 90 µm, or from about 100 µm to about 150 µm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while smaller particles scatter light at larger angles. The particle analyzer can then analyze the angular scattering data to calculate the size of the particles using the Mie theory of light scattering. Particle size can be reported as a volume equivalent sphere diameter. In some examples, the particle size ranges here can be considered to be a mathematical average of the particle sizes, which is normally about the same as the D50 particle size, but can be different depending on the particle size distribution.

That being stated, an example Gaussian-like distribution of the particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of about 25 µm means that about 50% of the particles (by number) have a particle size greater than about 25 µm and about 50% of the particles have a particle size less than about 25 µm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting of the particles.

The polymeric particles in the build material can have a melting point that can range from about 75° C. to about 350° C., from about 100° C. to about 300° C., or from about 150° C. to about 250° C. As examples, the build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the build material can include polyamide particles, such as polyamide-12, which can have a melting point from about 175° C. to about 200° C. In another example, elastomers such as thermoplastic polyamides can be used, which may have a melting point from about 135° C. to about 210° C. in some examples.

The build material may include, in addition to the polymeric particles, other particles such as filler particles, charging particles, flow aid particles, or a combination thereof. Charging particles, for example, may be added to suppress tribo-charging. Examples of suitable charging particles include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In an example, if added, the charging particles can be included in an amount ranging from greater than 0 wt % to about 20 wt %, from about 0.1 wt % to about 10 wt %, or from about 0.2 to about 5 wt %, based upon the total wt % of the build material.

Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity). Examples of suitable flow aid particles include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, if added, the flow aid particles can be included in an amount ranging from greater than 0 wt % to about 20 wt %, from about 0.1 wt % to about 10 wt %, or from about 0.2 to about 5 wt %, based upon the total wt % of the build material.

Fusing Agents

The multi-fluid kits and materials kits for three-dimensional printing described herein can include a fusing agent to be applied to the polymer build material. The fusing agent can include a radiation absorber that can absorb radiant energy and convert the energy to heat. In certain examples, the fusing agent can be used with a build material in a particular three-dimensional printing process. A thin layer of build material can be formed, and then the fusing agent can be selectively applied to areas of the build material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the build material that are desired to form a layer of the final three-dimensional printed object. After applying the fusing agent, the build material can be irradiated with radiant energy. The radiation absorber from the fusing agent can absorb this energy and convert it to heat, thereby heating any polymer particles in contact with the radiation absorber. An appropriate amount of radiant energy can be applied so that the area of the build material that was printed with the fusing agent heats up enough to melt the polymer particles to consolidate the objects into a solid layer, while the build material that was not printed with the fusing agent remains as a loose powder with separate particles.

In some examples, the amount of radiant energy applied, the amount of fusing agent applied to the build material, the concentration of radiation absorber in the fusing agent, and the preheating temperature of the build material (i.e., the temperature of the build material prior to printing the fusing agent and irradiating) can be tuned to ensure that the portions of the build material printed with the fusing agent will be fused to form a solid layer and the unprinted portions of the build material will remain a loose powder. These variables can be referred to as parts of the "print mode" of the three-dimensional printing system. Generally, the print mode can include any variables or parameters that can be controlled during three-dimensional printing to affect the outcome of the three-dimensional printing process.

Generally, the process of forming a single layer by applying fusing agent and irradiating the build material can be repeated with additional layers of fresh build material to form additional layers of the three-dimensional printed object, thereby building up the final object one layer at a time. In this process, the build material surrounding the three-dimensional printed object can act as a support material for the object. When the three-dimensional printing is complete, the object can be removed from the build material, e.g., build material that was not incorporated into the three-dimensional printed object, and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, or a combination thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, or a combination thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $CuzSi_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, or a combination thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer particles, the amount of radiation absorber in the polymer particles can be from about 0.0003 wt % to about 10 wt %, or from about 0.005 wt % to about 5 wt %, with respect to the weight of the polymer particles.

In some examples, the fusing agent can be jetted onto the polymer particles of the build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the build material during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di) esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), or a combination thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Pore-Promoting Agents

The pore-promoting agent can include a water-soluble pore-promoting compound that can chemically react at an elevated temperature to generate a gas, and/or which can chemically react with the acidic component of the acidic agent to generate a gas. As used herein, "chemically react" refers to a change in chemical composition and not a mere phase change from liquid or solid to gas. Many liquid solvents can evaporate to form a gas at an elevated temperature. However, the pore-promoting compound described herein does not refer to a liquid that evaporates at the elevated temperature. Instead, the pore-promoting compound undergoes a chemical reaction to form a different compound, either due to interaction with heat and/or interaction with the acidic component of the acidic agent. The product of this chemical reaction can be a gas, and the gas can remain in a gaseous state even after cooling back to room temperature in some instances. In some examples, the chemical reaction of the pore-promoting compound can proceed without any other reactants besides the pore-promoting compound exposed to heat, and in other examples, the pore-promoting compound can be reactive with the acidic component at temperatures ranging from room temperature to the molten temperature of the polymer particles of the build material. In certain examples, the pore-promoting compound can chemically decompose to form smaller molecules, and the product molecules can include a gas.

Non-limiting examples of pore-promoting compounds can include sodium bicarbonate, potassium bicarbonate, or a combination thereof. These compounds can chemically decompose to form a gas when heated to a decomposition temperature of from about 80° C. to about 200° C. These compounds can also react with an acidic component, such as many organic acids and/or inorganic acids. In some examples, the gas formed can include carbon dioxide gas.

In some examples, the pore-promoting agent can react to form a gas at an elevated temperature that is reached during the three-dimensional printing process. In some examples, the elevated temperature at which the pore-promoting compound reacts can be from about 80° C. to about 200° C. In further examples, the elevated temperature can be from about 90° C. to about 190° C. or from about 100° C. to about 180° C. In certain examples, the elevated temperature can be at or near the melting or softening point temperature of the polymer particles of the build material. For example, the elevated temperature can be within 20° C., within 15° C., or within 10° C. of the melting or softening point of the polymer particles. Thus the pore-promoting compound can react when the polymer particles are fused during the three-dimensional printing process. In other examples, the elevated temperature at which the pore-promoting compound reacts can be higher than the melting or softening point of the polymer particles. During the three-dimensional printing process, a sufficient amount of fusing agent can be applied to the polymer particles and a sufficient amount of radiation energy can be applied to heat the pore-promoting compound to the temperature at which the pore-promoting compound will react.

In some cases, the pore-promoting compound that is applied to the build material can react completely to form gas when the build material is heated during fusing of the polymer particles. In other words, all or nearly all of the pore-promoting compound can react to yield the gas. In other examples, a portion of the pore-promoting compound can react and another portion can remain unreacted. In certain examples, from about 50 wt % to about 100 wt % of the pore-promoting compound can react. In other examples, from about 60 wt % to about 95 wt % or from about 70 wt % to about 90 wt % of the pore-promoting compound can react. In still further examples, less of the pore-promoting compound can react. For example, from about 10 wt % to about 70 wt %, or from about 20 wt % to about 60 wt %, or from about 30 wt % to about 50 wt % of the pore-promoting compound can react. The amount of the pore-promoting compound that reacts can in some cases depend on the temperature to which the build material is heated, the length of time that the powder is held at that temperature, the total amount of radiation energy applied to the build material, and so on. Accordingly, in some examples, the amount of radiation energy applied, the length of time that the build material is heated, the temperature reached by the build material, the amount of fusing agent applied to the build material, and other variables can affect the extent of the reaction of the pore-promoting compound. Therefore, these variables can affect the porosity of the final three-dimensional printed object. These variables can be parts of the "print mode" of the three-dimensional printing process. The porosity can also be affected by changing the amount of pore-promoting agent that is applied to the build material. Accordingly, the print mode can be adjusted to affect the level of porosity in the three-dimensional printed object.

The total amount of pore-promoting compound and/or acidic compound that is applied and becomes present in a layer of the build material can affect the porosity of the three-dimensional printed object. As mentioned above, this variable can be adjusted by changing the amount of pore-promoting agent that is applied to the build material. Alternatively, the amount of pore-promoting compound applied to the build material can be changed by changing the concentration of pore-promoting compound in the pore-promoting agent. Likewise, changing the acidic component chosen and/or the concentration of the acidic component applied can also impact the porosity. The amount of pore-promoting compound can be selected to allow the pore-promoting agent to be jettable from a fluid jet printhead. In certain examples, the concentration of the pore-promoting compound in the pore-promoting agent can be from about 0.5 wt % to about 10 wt % with respect to the total weight of the pore-promoting agent. In further examples, the concentration of pore-promoting compound can be from 1 wt % to 8 wt % or from 2 wt % to 7 wt %.

The pore-promoting agent can also include ingredients to allow the pore-promoting agent to be jetted by a fluid jet printhead. In some examples, the pore-promoting agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Acidifying Agents

The acidic agent can include water and an acidic component that provides a pH to the acidic agent ranging from about pH 1 to about pH 6.9, from about pH 2 to about pH 6, or from about pH 3 to about pH 5. Examples of acidic components may include, for example, an organic acid or an inorganic acid. More specific examples of organic acids can include lactic acid, acetic acid, formic acid, citric acid, oxalic acid, uric acid malic acid, tartaric acid, or a combination thereof. Example inorganic acids can be hydrochloric acid, hydrobromic acid, hydroiodic acid, perchloric acid, phosphoric acid, sulfuric acid, boric acid, nitric acid, nitrous acid, or a combination thereof. The concentration of the acid may be dependent on whether the acid included is a strong acid or a weak acid, and how much chemical reaction between the pore-promoting compound and the acidic component may be desired by a user. As mentioned, the pore-promoting component can chemically react at an elevated temperature to generate a gas, but in accordance with details of the present disclosure, the pore-promoting compound may alternatively or additionally chemically react with the acidic component of the acidic agent to generate a gas.

In some cases, the acidic compound that is applied to the build material can react with the pore-promoting compound and be completely consumed, or partially consumed, and form a gas, depending on the concentrations of pore-promoting agent available for reaction. In some instances, if applied at the appropriate molar ratio, all or nearly all of the acidic compound can react to yield the gas with the pore-promoting compound. In some examples, if some of the acidic component remains unreacted, it may be desired to have a low enough concentration remaining within the three-dimensional printed part that it will not continue to interact with the polymer object once solidified to weaken or otherwise damage the object.

The total amount of acidic compound that is applied and becomes present in a layer of the build material can affect the porosity of the three-dimensional printed object. The acidic agent can have a concentration of acidic component that depends on the nature of the acid. The amount of acid that is included can be based in part on how much acid is desired to react with the bicarbonate when applied to the build material, and in part what may be otherwise healthy for the architecture, e.g., fluid ejectors or jetting printhead. For example, an acidifying agent can include water, organic cosolvent, other organic components, e.g., surfactant, etc., and can include an acid at a concentration suitable to bring the pH to the range of about pH 1 to about pH 6.9 or one of the other sub-pH ranges recited herein.

In further detail, in addition to the water, the acidic agent can also include ingredients to allow the pore-promoting agent to be jetted by a fluid jet printhead. In some examples, the acidic agent can include jettability imparting ingredients. These ingredients can include a liquid vehicle component such as surfactant, dispersant, organic co-solvent, biocide, viscosity modifier, material for pH adjustment, sequestering agent, preservative, and so on. These ingredients can be included in any of the amounts that provide for acceptable fluid jetting properties. Notably, some ingredients that may be used to enhance jettability may of themselves be acidic enough to act as the acidic component, and thus, a formulation without a traditional organic or inorganic acid can be used, provided the pH can be brought to a range from about pH 1 to about pH 6.9.

Other Fluid Agents

In further examples, multi-fluid kits or materials kits for three-dimensional printing can include other types of fluid agents, such as coloring agents and/or detailing agent. A coloring agent can include water (and other liquid vehicle components in some examples), and a colorant, such as a pigment and/or a dye. This type of agent can be used to add color to the three-dimensional printed object, particularly if the object being printed is light in color, e.g., white or pale in color.

A detailing agent, on the other hand, can be used to provide cooling to the materials during the printing of the object, and can include a detailing compound, for example. The detailing compound can be capable of reducing the temperature of the build material onto which the detailing agent is applied. In some examples, the detailing agent can be printed around the edges of the portion of the powder that is printed with the fusing agent, or can be printed within the object footprint while printing if cooling would be useful at a certain location or in certain circumstances. The detailing agent can increase selectivity between the fused and unfused portions of the build material by reducing the temperature around the edges of the portion to be fused.

In some examples, the detailing compound can be a solvent that evaporates at the temperature of the build material. In some cases the build material can be preheated to a preheat temperature within about 10° C. to about 70° C. of the fusing temperature of the polymer particles. Depending on the type of polymer particles used, the preheat temperature can be in the range of about 90° C. to about 200° C. or more. The detailing compound can be a solvent that evaporates when it comes into contact with the build material at the preheat temperature, thereby cooling the printed portion of the build material through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-methoxy-3-methyl-1-butanol, isobutyl alcohol, 1,4-butanediol, N,N-dimethyl acetamide, or a combination thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "D50 particle size" refers to a particle size distribution where about half of the particles are larger than the D50 value and about half of the particles are smaller in size than the D50 value. This can be determined based on the diameter of the particles for spherical particles, or if not spherical, can be based on the diameter of an equivalent spherical particle by volume. The D50 particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while smaller particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if a numerical value and sub-range is explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Materials Kit for Three-Dimensional Printing

A multi-fluid kit for three-dimensional printing is prepared in accordance with Tables 1-3 below. A general fusing agent formulation is shown in Table 1 that includes a near-infrared absorber as the radiation absorber. A more specific example of a pore-promoting agent formulation is provided in Table 2 that includes sodium bicarbonate as the pore-promoting compound. An example acidic agent formulation is also provided in Table 3 that includes citric acid as the acidic compound that can react with the sodium bicarbonate to form gas bubbles at room temperature and also at temperatures above room temperature where there may be molten polymer present during the build of a three-dimensional printed object. This multi-fluid kit is suitable for printing from fluidjet architecture onto a variety of build materials, such as build material containing polyamide particles, thermoplastic polyamide particles, polypropylene, or the like.

TABLE 1

Fusing Agent Formulation

| Component Category | Concentration (wt %) |
| --- | --- |
| Near-Infrared Absorber | 5-12 |
| Organic Cosolvent | 15-25 |
| Surfactant | 0.1-5 |
| Biocide | 0.01-0.1 |
| Complexing Agent | 0.001-0.01 |
| Deionized Water | Balance |

TABLE 2

Pore-promoting Agent Formulation

| Component | Category | Concentration (wt %) |
| --- | --- | --- |
| Sodium Bicarbonate | Pore-promoting Compound | 1-10 |
| Propylene Glycol | Organic Cosolvent | 5-30 |
| Tergitol ® 15-S-9 | Surfactant | 0.1-1 |
| Deionized Water | Solvent | Balance |

TABLE 3

Acidic Agent Formulation

| Ingredient | Category | Concentration (wt %) |
| --- | --- | --- |
| Citric Acid | Acidic Component | 5 |
| Propylene Glycol | Organic Cosolvent | 3-15 |
| 2-phenoxyethanol | Organic Cosolvent | 0.1-3 |
| EDTA disodium salt | Chelating Compound | 0-0.5 |
| Dioctyl Sulfosuccinate | Surfactant | 0-1 |
| Deionized Water | Solvent | Balance |

Example 2—Three-Dimensional Printing

A thermoplastic polyurethane (TPU) build material having a D50 particle size of about 50-80 μm is used to form a powder bed and the powder bed is preheated to about 90-100° C. A fusing agent prepared in accordance with Table 1 is applied iteratively to build material layers spread at a thickness of about 100-120 µm. The fusing agent is applied at a sufficient contone to substantially fully penetrate the individual build material layers and to provide enough radiation absorber to raise the temperature of the build material about 30-40° C. to about 120-140° C. In this example, after the fusing agent is applied that corresponds with a single-layer footprint of the three-dimensional printed object to be formed, a Pore-promoting Agent Formulation prepared in accordance with Table 2 is applied to a portion of the footprint. The carbon dioxide gas can begin to generate from the sodium bicarbonate at the preheating temperature, e.g., at temperatures below the fusing temperature of the TPU. In this example, the polymer particles selected for use have a relatively low melting temperature, so at the preheating temperature, some gas may be formed. It is noted that polymer particles could likewise be selected that are at a preheating temperature where gas generation may not occur. However, in this example, it is noted that though sodium bicarbonate does not generate a gas at room temperature, at about 80° C., sodium bicarbonate can generate a gas based on the temperature alone. Notably, sodium bicarbonate when admixed with citric acid, such as that in the Acidic Agent Formulation of Table 3, has been found to generate the carbon dioxide gas at room temperature. This establishes that when applied in the context of the present example, even more gas can be generated at lower temperatures, e.g., the preheating temperature or even lower temperatures. Thus, enhancing or increasing gas bubble generation at this lower temperature can occur by applying the acidic along with the pore-promoting agent to accelerate the chemical reaction or to generate additional gas bubbles that may be more densely generated compared to examples that simply use heat with the pore-promoting agent. Where applied at the same locations, if the sodium bicarbonate and the citric acid can be applied at about a 1:1 molar ratio, the chemical reaction that occurs may be as follows:

$$NaHCO_3+HC_2H_3O_2 \rightarrow NaC_2H_3O_2+H_2O+CO_2$$

Next, a radiation source positioned over the powder bed applies electromagnetic radiation. The build material areas that include the presence of the fusing agent as applied becomes heated further to a level where the thermoplastic polyamide particles become molten. As a result, gas being generated within the molten polymer can push away the molten polymer. This process is repeated multiple times in a layer-by-layer manner until the three dimensional object is formed. Upon cooling (as the build occurs at lower layers or after the build is complete), the gas bubbles generated during the process may leave portions of the three-dimensional object in more porous areas than at areas where the pore-promoting agent (and acidic agent as applicable) are not applied.

What is claimed is:

1. A multi-fluid kit for three-dimensional printing, the multi-fluid kit comprising:
   a fusing agent comprising water and a radiation absorber, wherein the radiation absorber absorbs radiation energy and converts the radiation energy to heat;
   an acidic agent contained separately from the fusing agent, the acidic agent comprising water and an acidic component, the acidic agent having a pH from about pH 1 to about pH 6.9; and
   a pore-promoting agent contained separately from the fusing agent and the acidic agent, the pore-promoting agent comprising water and a pore-promoting compound that is water-soluble, wherein the pore-promoting compound chemically reacts with the acidic component of the acidic agent to generate a gas and the pore-promoting compound is selected from the group consisting of sodium bicarbonate, potassium bicarbonate, and a combination thereof.

2. The multi-fluid kit of claim 1, wherein the pore-promoting compound is sodium bicarbonate and is present in an amount of from about 1 wt % to about 10 wt % with respect to the total weight of the pore-promoting agent.

3. The multi-fluid kit of claim 1, wherein the pore-promoting compound is potassium bicarbonate and is present in an amount of from about 1 wt % to about 20 wt % with respect to the total weight of the pore-promoting agent.

4. The multi-fluid kit of claim 1, wherein;
   the acidic agent further includes an organic co-solvent and a surfactant; and
   the pore-promoting agent further includes an organic co-solvent and a surfactant.

5. The multi-fluid kit of claim 1, wherein the acidic component is an organic acid selected from the group consisting of lactic acid, acetic acid, formic acid, citric acid, oxalic acid, uric acid malic acid, tartaric acid, and a combination thereof.

6. The multi-fluid kit of claim 1, wherein the acidic component is an inorganic acid selected from the group consisting of hydrochloric acid, hydrobromic acid, hydroiodic acid, perchloric acid, phosphoric acid, sulfuric acid, boric acid, nitric acid, nitrous acid, and a combination thereof.

7. The multi-fluid kit of claim 1, wherein the pore-promoting compound generates a gas at an elevated temperature of from about 80° C. to about 200° C., and wherein the pore-promoting compound generates an increased volume density of gas at the elevated temperature upon contact with the acidic component.

8. The multi-fluid kit of claim 1, wherein the radiation absorber is a metal dithiolene complex, carbon black, a near-infrared absorbing dye, a near-infrared absorbing pigment, metal nanoparticles, a conjugated polymer, or a combination thereof.

9. A three-dimensional printing kit, comprising:
   a build material comprising polymer particles;
   a fusing agent comprising water and a radiation absorber, wherein the radiation absorber absorbs radiation energy and converts the radiation energy to heat;
   an acidic agent contained separately from the fusing agent, the acidic agent comprising water and an acidic component, the acidic agent having a pH from about pH 1 to about pH 6.9; and
   a pore-promoting agent contained separately from the fusing agent and the acidic agent, the pore-promoting agent comprising water and a pore-promoting compound that is water-soluble, wherein the pore-promoting compound chemically reacts with the acidic component to generate a gas and the pore-promoting compound is selected from the group consisting of sodium bicarbonate, potassium bicarbonate, and a combination thereof.

10. The three-dimensional printing kit of claim 9, wherein the polymer particles have a D50 particle size of from about 20 µm to about 150 µm and include polyamide-6, polyamide-9, polyamide-11, polyamide-12, polyamide-6,6, polyamide-6,12, polyethylene, thermoplastic polyurethane, thermoplastic polyamide, polypropylene, polyester, polycarbonate, polyether ketone, polyacrylate, polystyrene powder, wax, or a combination thereof.

11. The three-dimensional printing kit of claim 9, wherein the pore-promoting compound generates a gas at an elevated temperature of from about 80° C. to about 200° C., and wherein the pore-promoting compound generates an increased volume density of gas at the elevated temperature upon contact with the acidic component.

12. A method of three-dimensional printing, the method comprising:
   iteratively applying individual build material layers of polymer particles to a powder bed;
   based on a three-dimensional object model, selectively applying a fusing agent onto the individual build material layers, wherein the fusing agent comprises water and a radiation absorber;
   based on the three-dimensional object model, selectively applying a pore-promoting agent onto the individual build material layers, wherein the pore-promoting agent is separate from the fusing agent and comprises water and a pore-promoting compound that is water-soluble, and wherein the pore-promoting compound is selected from the group consisting of sodium bicarbonate, potassium bicarbonate, and a combination thereof;
   based on the three-dimensional object model, selectively applying an acidic agent onto the individual build material layers at a location of application of the pore-promoting agent, wherein the acidic agent is separate from the fusing agent and the pore-promoting agent, and wherein the pore-promoting compound chemically reacts with the acidic component, thereby generating gas bubbles within the individual build material layers at the location; and
   exposing the build material to energy, which generates heat to selectively fuse the polymer particles in contact with the radiation absorber and form a fused polymer matrix at individual build material layers with the gas bubbles distributed within the fused polymer matrix.

13. The method of claim 12, wherein in addition to the chemical reaction of the pore-promoting compound with the acidic compound, the heat generated upon exposing the build material to the energy also generates additional gas bubbles, wherein isolated pores in the fused polymer matrix, resulting from both i) the chemical reaction of the pore-promoting compound with the acidic compound and ii) the application of the heat, have a D50 diameter of from about 1 µm to about 500 µm.

* * * * *